Sept. 18, 1962   N. T. GENERAL ETAL   3,054,488
FLUID PRESSURE OPERATED OVERRUNNING COUPLING
Filed June 24, 1960   2 Sheets-Sheet 1
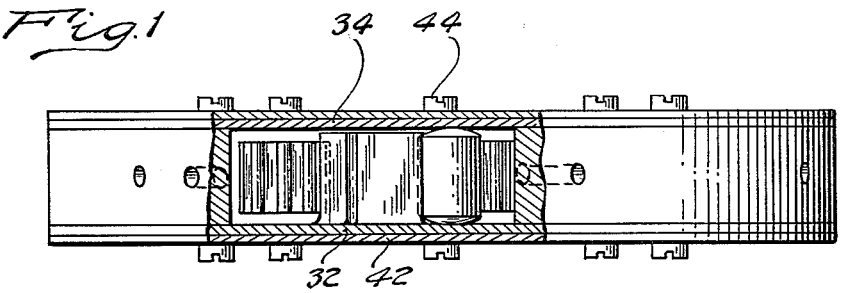
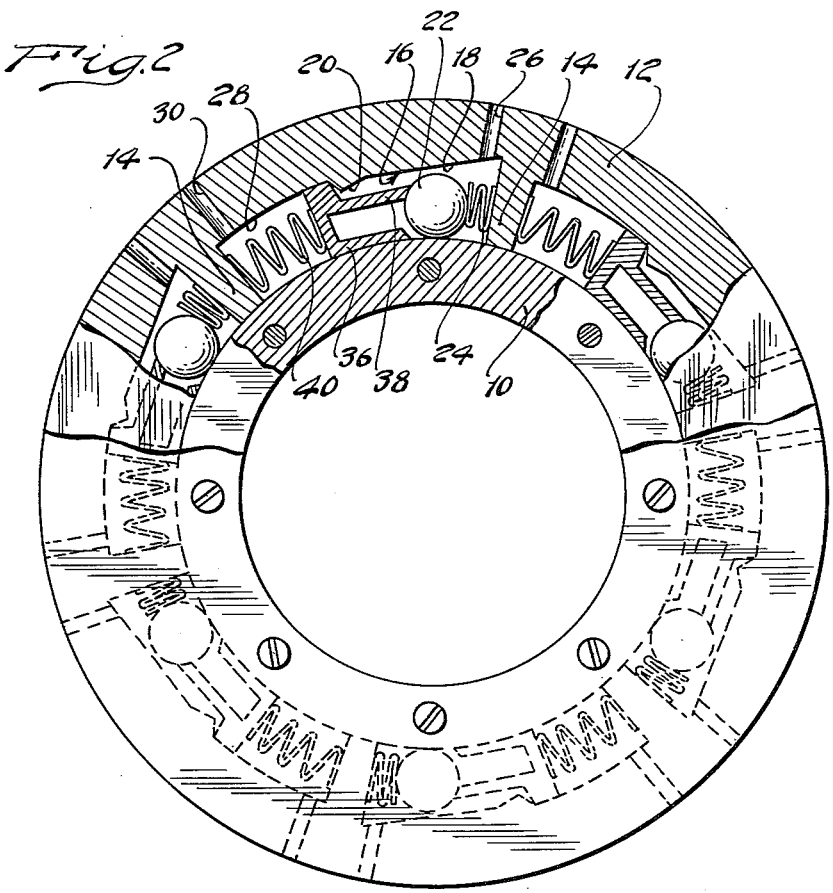
INVENTORS.
NORMAN T. GENERAL
BY PO-LUNG LIANG
ATTORNEYS.

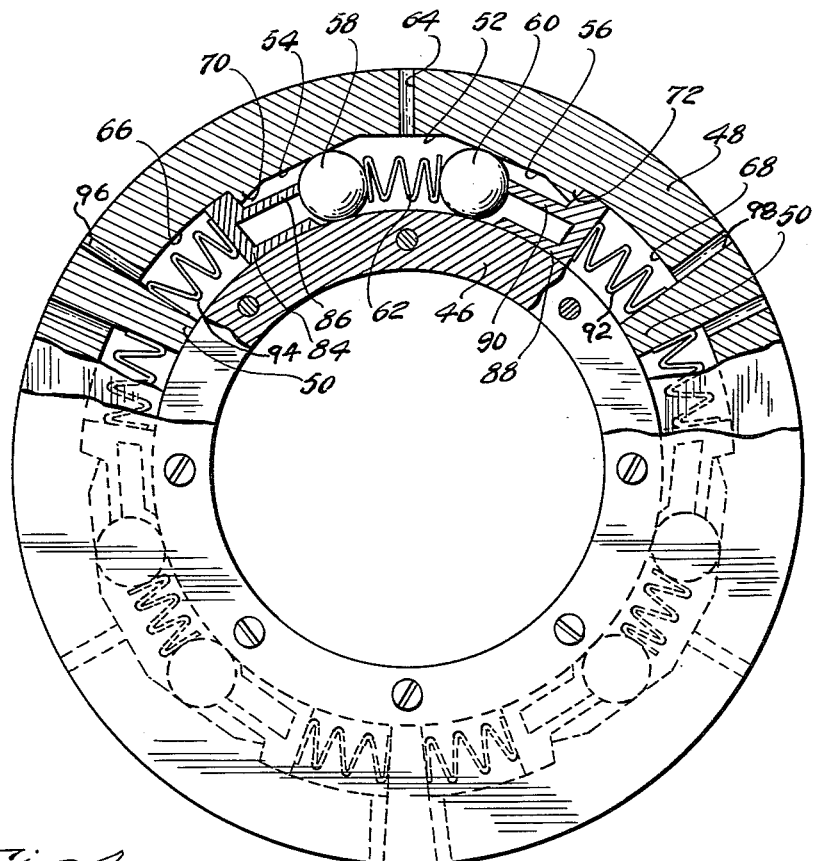

United States Patent Office 3,054,488
Patented Sept. 18, 1962

3,054,488
FLUID PRESSURE OPERATED OVERRUNNING COUPLING
Norman T. General, Farmington, and Po-lung Liang, Lincoln Park, Mich., assignors to Ford Motor Company, Dearborn, Mich., a corporation of Delaware
Filed June 24, 1960, Ser. No. 38,500
5 Claims. (Cl. 192—44)

Our invention relates generally to overrunning couplings, and more particularly to a roller coupling wherein provision is made for controlling the engaging and releasing action.

Our improved coupling is capable of functioning either as a clutch or as a brake, and it is particularly adapted to be used in combination with gear elements in a multiple speed, power transmission mechanism for producing speed ratio changes. When used in such an environment, our improved coupling construction can be adapted to selectively anchor one of the gear elements of the transmission mechanism and to thereby accommodate a transfer of driving torque reaction to the transmission casing, or it can be adapted to selectively couple one element of the torque delivery path to another.

According to a principal feature of our invention, we have provided a roller coupling mechanism with inner and outer coupling races wherein the rollers can be urged into clutching engagement or into a clutch release position by means of fluid pressure. A phasing ring is used to simultaneously actuate the rollers toward a coupling releasing position. In one preferred embodiment of our invention, the coupling is double acting, and it includes two separate series of rollers, the rollers of one series being adapted to selectively inhibit relative rotation between the coupling races in one direction, and the rollers of the other series being adapted to inhibit such relative rotation in the opposite direction. Each series of rollers is provided with a phasing ring, the phasing rings of each series including piston portions which cooperate with one of the races to define a pressure chamber. Fluid pressure can be selectively distributed to these chambers to control the coupling action.

According to another embodiment of our invention, the coupling is single acting, and it includes only a single series of rollers. A phasing ring is associated with the single series of rollers, and it may be actuated hydraulically to permit disengagement of the coupling under load.

Our instant invention includes features that are common to the coupling mechanisms disclosed in pending applications Serial Nos. 38,499 and 39,701. These applications are assigned to the assignee of our instant invention, and reference may be made thereto for the purpose of supplementing our instant disclosure.

The provision of an improved coupling of the type above described being a principal object of our invention, it is a further object of our invention to provide an overrunning coupling which is normally adapted to accommodate free-wheeling in either direction, and wherein provision is made for selectively inhibiting relative rotation between the coupling races in either one direction or the other as desired.

It is a further object of our invention to provide an overrunning coupling of the type above set forth wherein means are provided for releasing the coupling when it is under load.

For the purpose of more particularly describing our instant invention, reference will be made to the accompanying drawings, wherein:

FIGURE 1 shows a plan view, partly in section, of a first embodiment of our invention;

FIGURE 2 is a transverse partial cross-sectional view of the coupling of FIGURE 1;

FIGURE 3 is a plan view, partly in section, of a second embodiment of our invention; and FIGURE 4 is a transverse partial cross-sectional view of the coupling of FIGURE 3.

Referring first to FIGURES 1 and 2, numeral 10 designates a cylindrical inner race and numeral 12 designates a cylindrical outer race, said races being concentrically disposed one within the other. The outer race 12 includes pilot portions 14 which slidably engage the outer surface of race 10. The races 10 and 12 may be piloted with respect to each other in this fashion.

If the structure of FIGURES 1 and 2 is used in a geared power transmission environment, the races 10 and 12 can be connected to separate power delivery portions of the power flow path, or the race 12 can be anchored to the transmission casing while race 10 is connected to one of the gear elements of the mechanism.

The outer race 12 is formed with a plurality of recesses generally designated by reference character 16. Each recess 16 defines a cam surface 18 extending between an abutment 20 and the portion 14 on the right-hand side of the recess, as viewed in FIGURE 2. A roller 22 is situated in each recess 16, and it is adapted to cooperate with a cam surface 18 to establish a camming action between the races 10 and 12. The rollers 22 are biased into camming engagement with the cam surfaces 18 by means of convoluted leaf springs 24 that are anchored on the adjacent portion 14 of the race 12. A fluid pressure passage 26 is formed in the race 12, and it communicates with the right-hand side of the recess 16, as viewed in FIGURE 2. Recess 16 further includes a portion 28 having a surface which is concentrically related with respect to the outer surface of the inner race 10. A fluid pressure passage 30 communicates with this portion 28 of the recess 16.

A phasing ring 32 is situated on one axial side of the outer race 12, as best seen in FIGURE 1, and it partially encloses the recess 16. Phasing ring 32 can be in the form of a plate which is adapted to move relative to outer race 12. A cover plate 34 is disposed on the opposite side of the outer race 12, and it also partially encloses the recess 15. The plate 12, the phasing ring 32 and the portion 28 of the recess 16 cooperate to define a pressure chamber.

The phasing ring 32 has formed thereon a piston portion 36 which extends within the portion 28 of the recess 16. Piston portion 36 is formed with a circular inner surface that slidably engages the outer surface of coupling race 10. It is also formed with an outer surface which slidably cooperates with the concentric portion 28 of recess 16.

Piston portion 36 further includes a pawl 38 that is adapted to engage roller 22, and when it is in the position shown, the pawl 38 urges roller 22 out of camming engagement with the cam surface 18. A convoluted leaf spring 40 is situated between the adjacent portion 14 of the outer race 12 and the piston portion 36, thereby tending to normally urge the phasing ring 32 in a clockwise direction.

A cover plate 42 is secured to inner race 10, and it overlaps the outer race 12 to form a fluid seal for the phasing ring 32. Suitable bolts can be provided for securing both the plate 42 and the plate 34 to the inner race 10.

The recesses 16 are angularly positioned at spaced intervals about the inner periphery of race 12 and a piston portion 36 of the phasing ring 32 is situated within each recess, as above described. Further, a separate roller is disposed in each recess, and the phasing ring 32 and the associated piston portions and pawls are adapted to simultaneously actuate each of the rollers.

When the structure of FIGURES 1 and 2 is used in a power transmission mechanism, suitable controls can be provided for controlling the distribution of fluid pressure to the ports 26 and 30. If these passages 26 and 30 are each exhausted, the springs 24 and 40 will normally maintain the rollers in a neutral position thereby permitting relative rotation between races 10 and 12 to take place in either direction. If the passage 30 is pressurized, the rollers will assume the position shown in FIGURE 2, and if passage 26 is pressurized while passage 30 is exhausted, the coupling will assume a locked-up position since the phasing ring 32 and the piston portions 36 will be urged in a counterclockwise direction, as viewed in FIGURE 2. This permits springs 24 to urge the rollers 22 into camming engagement with their respective cam surfaces 18. The coupling can be released under load by applying a sufficient pressure to the passage 40 while simultaneously exhausting passage 26.

Referring next to FIGURES 3 and 4, we have illustrated a roller coupling which is capable of inhibiting relative rotation in either direction, and for this reason it can be appropriately referred to as a double acting overrunning coupling.

The coupling of FIGURES 3 and 4 includes an inner race 46 and an outer race 48 that are concentrically positioned with respect to each other. Outer race 48 includes pilot portions 50 which are formed with concave inner surfaces that slidably cooperate with the outer surface of race 46. Recesses 52 are formed at spaced intervals on the inner periphery of the outer race 48, and these recesses define a pair of opposed cam surfaces 54 and 56. A pair of rollers 58 and 60 is positioned within each recess 52, the roller 58 cooperating with cam surface 54 and the roller 60 cooperating with cam surface 56. The rollers 58 and 60 are biased apart by a convoluted leaf spring 62 so that the rollers 58 and 60 are normally urged toward their respective cam surfaces. A fluid pressure passage 64 is formed in the outer race 48, and it communicates with the central region of the recess 52.

Recess 52 further includes portions 66 and 68 which are formed with surfaces that are concentrically related with respect to the outer surface of the coupling race 46. The surface of portion 66 is separated from cam surface 54 by an abutment 70. Similarly, the surface of portion 68 is separated from cam surface 56 by an abutment 72.

As best seen in FIGURE 3, a phasing ring 74 is situated on one side of the outer race 48, and another phasing ring 76 is situated on the opposite side thereof. These phasing rings enclose the recess 52, and they are adapted to move angularly with respect to the outer surface 48 about the central axis of the coupling. A plate 78 is secured to one side of the inner race 12, and its overlaps the phasing ring 76 to provide a fluid pressure seal. Similarly, a plate 80 is secured to the opposite side of inner race 46, and it overlaps phasing ring 74 to form a fluid pressure seal. Plates 78 and 80 can be secured to inner race 46 by means of bolts 82.

Phasing ring 76 is formed with a plurality of piston portions 84 that extend within portions 66 of the recesses 52. Piston portions 84 are formed with radially inward and radially outward curved surfaces which slidably cooperate with the outer surface of race 46 and the surfaces of portions 66, respectively. Each piston portion 84 also carries a pawl 86 which is adapted to engage adjacent roller 58. When the piston portion 84 is in the position shown, roller 58 is urged out of camming engagement with cam surface 54.

Phasing ring 74 also has secured thereto a plurality of piston portions 88, one piston portion 88 extending within each portion 68 of the recesses 52. Piston portions 88 are biased in a counterclockwise direction, as viewed in FIGURE 4, by convoluted leaf springs 92 situated adjacent pilot portions 50. A pawl 90 is formed on each piston portion 88, said pawls being adapted to engage rollers 60 to urge the same out of camming engagement with cam surfaces 56. The inner and outer surfaces of the piston portions 88 slidably engage concentric surfaces on the outer periphery of the coupling race 46 and on the portions 68 of the recesses 52.

In a similar fashion, a convoluted leaf spring 94 engages piston portions 84 to urge the latter in a clockwise direction, as viewed in FIGURE 4. The portions 66 and 68 of the recess 52 are in fluid communication with pressure passages 96 and 98, and means may be provided for selectively pressurizing these passages in sequence with the distribution of pressure to passages 64.

The coupling construction of FIGURES 3 and 4 will permit overrunning motion in either direction when passages 64, 96 and 98 are exhausted. When pressure passage 64 is pressurized and passages 96 and 98 are exhausted, the coupling will lock-up to inhibit relative rotation between the coupling races in either direction.

If pressure passage 96 is exhausted while pressure passage 98 is pressurized, relative rotation of race 46 with respect to race 48 in a counterclockwise direction will be inhibited. Conversely, if pressure passage 96 is pressurized while pressure passage 98 is exhausted, relative rotation between the races in the opposite direction will be inhibited.

If both passages 64 and 98 are pressurized while passage 96 is exhausted, relative rotation of coupling race 46 relative to coupling race 48 in a counterclockwise direction will be inhibited. Conversely, if pressure passage 64 and pressure passage 96 are both pressurized while passage 98 is exhausted, relative rotation between the coupling races in the opposite direction will be inhibited.

The coupling of FIGURES 3 and 4 can be disengaged under load when hydraulic pressure is applied to either passages 96 or 98.

Having thus described the principal features of our invention, what we claim and desire to secure by U.S. Letters Patent is:

1. A double acting overrunning coupling comprising concentric inner and outer cylindrical races, an arcuate recess formed in the outer race, the peripherally spaced extremities of said recess being formed with surfaces that are concentrically related with respect to the outer surface of said inner race, a pair of juxtaposed cam surfaces defined by the central region of said recess, a pair of rollers positioned in said recess, a separate one of said rollers being engageable with each recess, a spring disposed between said rollers whereby said rollers are biased apart into camming engagement with their respective cam surfaces, a pair of phasing rings, one ring being disposed on each axial side of the outer rate, a piston portion carried by each phasing ring, one piston portion being disposed in each of said recess extremities and defining therewith a pressure chamber, each piston portion being engageable with the adjacent roller to urge normally the same out of camming engagement with the associated cam surface, and passage means including portions communicating with each pressure chamber and with the central recess region for selectively pressurizing and exhausting said pressure chambers and said central recess region.

2. A double acting overrunning coupling comprising concentric inner and outer cylindrical races, an arcuate recess formed in the outer race, the peripherally spaced extensions of said recess being formed with surfaces that are concentrically related with respect to the outer surface of said inner race, a pair of juxtaposed cam surfaces defined by the central region of said recess, a pair of rollers positioned in said recess, a separate one of said rollers being engageable with each cam surface, a first spring disposed between said rollers whereby said rollers are biased apart into camming engagement with their respective cam surfaces, a pair of phasing rings, one ring being disposed on each axial side of the outer race, a piston portion carried by each phasing ring, one piston portion being disposed in each of said recess extremities and defining therewith a pressure chamber, a pawl carried by each piston portion, a second spring acting on each piston portion and urging the same toward said central recess region, each of said second springs being engageable with the adjacent end of said recess, the force of said second springs being greater than the opposing force of said first spring whereby said rollers are normally urged out of camming engagement with their respective cam surfaces when the pressure forces acting on said piston portions is zero, each pawl being engageable with the adjacent roller to urge normally the same out of camming engagement with the associated cam surface, and passage means including portions communicating with each pressure chamber and with the central recess region for selectively pressurizing and exhausting said pressure chambers and said central recess region.

3. A double acting overrunning coupling comprising concentric inner and outer coupling races, one of said races being formed with a cam recess, said recess defining a pair of juxtaposed cam surfaces, a pair of rollers disposed in said recess, each roller being engageable with a separate one of said cam surfaces, first spring means for normally biasing said rollers toward a cam surface engaging position, spring means for normally urging said rollers out of camming engagement with their respective cam surfaces, and fluid pressure operated means for overruling the force of said first spring means whereby clutching engagement of said rollers can be selectively controlled.

4. A double acting overrunning coupling mechanism comprising concentric inner and outer races, a cam recess formed in said outer race, said cam recess defining a pair of juxtaposed cam surfaces, a pair of rollers situated in said recess, each roller being engageable with a separate one of said cam surfaces, one roller being adapted to inhibit relative rotation between said races in one direction and the other roller being adapted to inhibit such relative rotation in the opposite direction, means for normally urging said rollers toward a neutral position out of camming engagement with their respective cam surfaces, and fluid pressure operated means for simultaneously engaging both rollers and for alternately releasing the same.

5. The combination as set forth in claim 4 wherein said outer race is formed with a plurality of recesses, and a pair of rollers situated in each recess, said pressure operated means including piston members situated in said recesses for simultaneously actuating one roller of each pair, the piston members associated with the corresponding rollers of each pair being connected to a common phasing ring for simultaneous movement.

References Cited in the file of this patent
UNITED STATES PATENTS 1,807,035   Herman _____ May 26, 1931

FOREIGN PATENTS 1,061,396   France _____ Nov. 25, 1953